(12) United States Patent
Shinoda

(10) Patent No.: US 7,457,624 B2
(45) Date of Patent: Nov. 25, 2008

(54) MOBILE STATION EXPEDITING LOCATION REGISTRY TO BASE STATION

(75) Inventor: Koji Shinoda, Chiryu (JP)

(73) Assignee: Denso Corporation, Kariya (JP)

( * ) Notice: Subject to any disclaimer, the term of this patent is extended or adjusted under 35 U.S.C. 154(b) by 925 days.

(21) Appl. No.: 10/299,507

(22) Filed: Nov. 19, 2002

(65) Prior Publication Data

US 2003/0100306 A1    May 29, 2003

(30) Foreign Application Priority Data

Nov. 29, 2001  (JP)  ............................. 2001-364541
Nov. 29, 2001  (JP)  ............................. 2001-364542

(51) Int. Cl.
    H04Q 7/20       (2006.01)
(52) U.S. Cl. .................. 455/440; 455/435.1; 455/436
(58) Field of Classification Search .............. 455/432.1, 455/432.3, 433, 435.1, 435.2, 435.3, 436, 455/437, 439, 440, 509, 513, 515
See application file for complete search history.

(56) References Cited

U.S. PATENT DOCUMENTS

| | | | |
|---|---|---|---|
| 5,754,956 A * | 5/1998 | Abreu et al. ................. | 455/434 |
| 6,223,043 B1 | 4/2001 | Hazama | |
| 6,400,952 B2 | 6/2002 | Kim et al. | |
| 6,430,414 B1 | 8/2002 | Sorokine et al. | |
| 6,633,554 B1 * | 10/2003 | Dalal .......................... | 370/331 |
| 6,810,254 B2 * | 10/2004 | Tiedemann et al. ......... | 455/437 |
| 6,950,417 B2 * | 9/2005 | Soliman ...................... | 370/335 |
| 7,076,248 B2 * | 7/2006 | Amirijoo et al. ......... | 455/432.1 |
| 7,142,858 B2 * | 11/2006 | Aoki et al. .................. | 455/436 |
| 2002/0034947 A1 * | 3/2002 | Soliman ...................... | 455/436 |
| 2002/0168982 A1 | 11/2002 | Sorokine et al. | |
| 2002/0197992 A1 * | 12/2002 | Nizri et al. .................. | 455/435 |
| 2003/0039228 A1 * | 2/2003 | Shiu et al. ................... | 370/331 |
| 2004/0235478 A1 * | 11/2004 | Lindquist et al. ............ | 455/440 |
| 2006/0114859 A1 * | 6/2006 | Sudo et al. .................. | 370/335 |
| 2007/0032234 A1 * | 2/2007 | Jain et al. ................ | 455/435.1 |

FOREIGN PATENT DOCUMENTS

| | | |
|---|---|---|
| JP | 5-030023 | 7/1991 |
| JP | 5-102919 | 10/1991 |
| JP | 8-107584 | 4/1996 |
| JP | 10-108243 | 9/1996 |
| JP | 9-116952 | 5/1997 |

(Continued)

*Primary Examiner*—Charles N Appiah
*Assistant Examiner*—Joy K. Contee
(74) *Attorney, Agent, or Firm*—Harness, Dickey & Pierce, PLC

(57) ABSTRACT

When a cell phone fails in location registry to a base station, it removes the base station from a candidate group. Then it searches for and captures, for the next location registry, a base station whose pilot signal has the highest electric field intensity among the updated candidate group. When the registry is yet to be successful, the cell phone prohibits the location registry with maintaining an idle (waiting) state. Here, the pilot signals are observed among the candidate group. When a certain base station whose pilot signal exceeds a preset level of electric field intensity is detected, the idle handoff to the certain base station is executed. This success of the idle handoff then resumes the location registry to the certain base station.

9 Claims, 4 Drawing Sheets

FOREIGN PATENT DOCUMENTS

| | | |
|---|---|---|
| JP | 10-336724 | 12/1998 |
| JP | 2000-69523 | 3/2000 |
| JP | 2001-128226 | 5/2001 |
| JP | 2001-169332 | 6/2001 |
| JP | 2002-369236 | 12/2002 |

* cited by examiner

| CANDIDATE | PN OFFSET | PILOT INTENSITY |
|---|---|---|
| BS-A | 36 | −15dB |
| BS-B | 124 | −8dB |
| BS-C | 368 | −20dB |
| BS-D | 182 | −24dB |

FIG. 3A

| CANDIDATE | PN OFFSET | PILOT INTENSITY |
|---|---|---|
| BS-A | 36 | -15dB |
| BS-B | 124 | -8dB |
| BS-C | 368 | -20dB |
| BS-D | 182 | -24dB |

FIG. 3B

| CANDIDATE | PN OFFSET | PILOT INTENSITY |
|---|---|---|
| BS-A | 36 | -15dB |
| BS-B | 124 | -8dB |
| BS-C | 368 | -20dB |
| BS-D | 182 | -24dB |
| BS-E | 256 | -10dB |

FIG. 3C

| CANDIDATE | PN OFFSET | PILOT INTENSITY |
|---|---|---|
| BS-A | 36 | -15dB |
| BS-C | 368 | -20dB |
| BS-D | 182 | -24dB |
| BS-E | 256 | -10dB |

US 7,457,624 B2

MOBILE STATION EXPEDITING LOCATION REGISTRY TO BASE STATION

CROSS REFERENCE TO RELATED APPLICATIONS

This application is based on and incorporates herein by reference Japanese Patent Application Nos. 2001-364541 filed on Nov. 29, 2001 and 2001-364542 filed on Nov. 29, 2001.

FIELD OF THE INVENTION

The present invention relates to a mobile station adopting a CDMA (code division multiple access) method such as a cell phone which is capable of expediting requests of location registry to a base station.

BACKGROUND OF THE INVENTION

Recent cell phones adopt CDMA (code division multiple access) method. However, as shown FIG. 4, communication of the cell phone is, in some cases, affected by a location or an environment when the cell phone 1 captures a base station 2. A receiving (downward) signal 3 from the base station 2 to the cell phone 1 is received by the cell phone 1, while a transmitting (upward) signal 4 is not received by the base station 2. Provided that the cell phone 1 transmits a request for location registry to the base station 2 under the state shown in FIG. 4, the base station 2 cannot receive the request. This leads to continuing of transmitting of the request by the cell phone 1, resulting in not only interfering with communications of other cell phones but also reducing a success rate in the communications in the total system.

On the other hand, the request continuation leads to increase of power consumption of the cell phone 1 which is typically battery driven and to running down of the battery.

In JP-P2001-128226A, when the location registry fails, ceasing operations of transmitting and receiving for a preset period prevents the power consumption from increasing. After the preset period, the cell phone 1 may succeed in the location registry with recovery of radio wave condition. However, the location registry must be stopped until the preset period is elapsed so that this approach seems to be of less practical use.

SUMMARY OF THE INVENTION

It is therefore a first object of the present invention to provide a mobile station which is capable of preventing continuous retries of a request for location registry and increase of power consumption. A second object of the present invention is to provide a mobile station which is capable of resuming the location registry immediately after the location registry becomes possible.

To achieve the above objects, a mobile station updates the candidate base stations by excluding the base station to which the location registry has failed. Then the mobile station differently captures a given base station from the updated candidate base stations and then differently requests the location registry to the differently captured given base station.

In one embodiment of the invention, the mobile station updates the candidate base stations by adding the base station, to which the location registry has most recently succeeded.

Furthermore, a mobile station prohibits a different request for the location registry with maintaining an idle (waiting) state, where at least an idle handoff to a certain base station can be executable, when the location registry to the base station has failed. The mobile station then resumes a different request for the location registry to the certain base station by a prohibition-release condition that the idle handoff to the certain base station has succeeded.

In one embodiment of the invention, in the idle state transmitting and receiving can be also executable. In addition, in one embodiment of the invention, the prohibition-release condition also includes an elapse of a preset period after the location registry to the base station has failed.

BRIEF DESCRIPTION OF THE DRAWINGS

The above and other objects, features and advantages of the present invention will become more apparent from the following detailed description made with reference to the accompanying drawings. In the drawings:

FIGS. 3A, 3B and 3C are tables of data regarding candidate base stations of the cell phone according to the embodiment.

DETAILED DESCRIPTION OF THE PREFERRED EMBODIMENTS

Figures 1A, 1B:
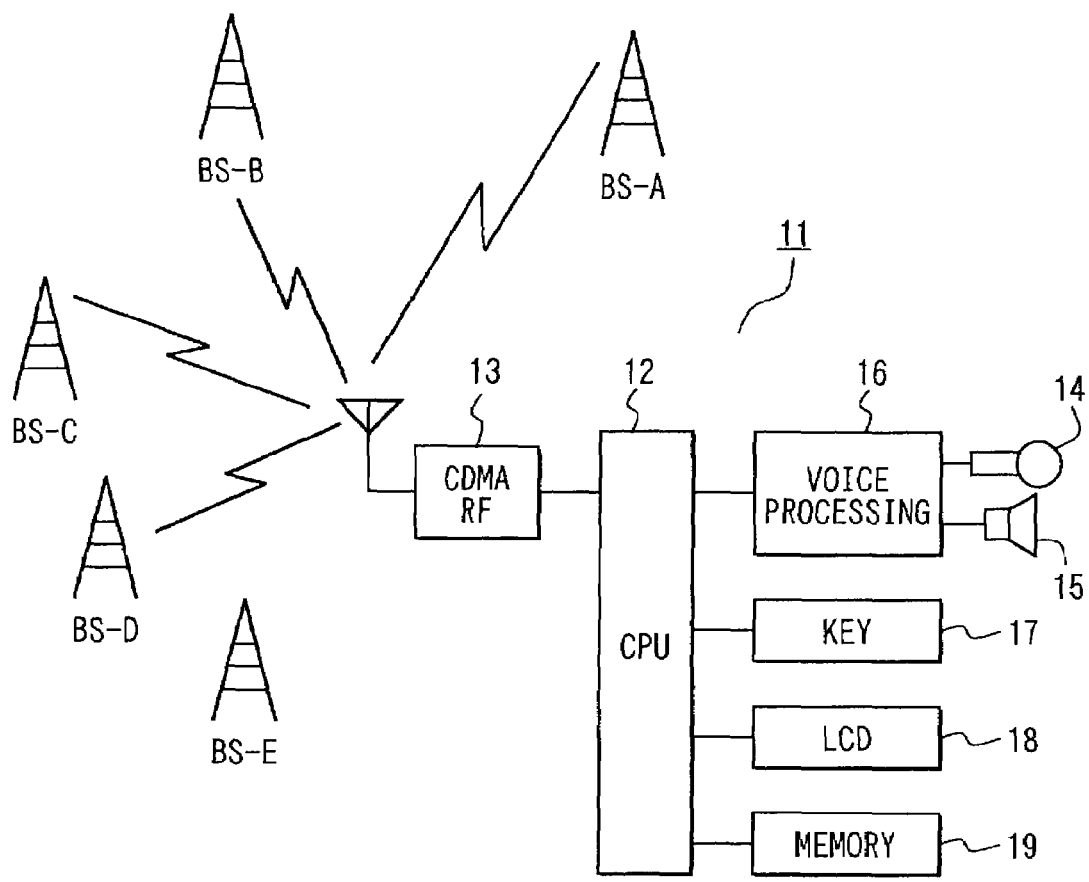
FIG. 1A is a schematic diagram of functional blocks and a communication system of a cell phone.
FIG. 1B is a table of data regarding candidate base stations of the cell phone.

As shown in FIG. 1A, a cell phone 11 as a mobile station communicates, compliantly with a CDMA (code division multiple access), with each of a plurality of base stations (BS-A to BS-E) through a CDMA RF (radio frequency) unit 13. The cell phone 11 is equipped with a CPU (central processing unit) 12, mainly composed of a microcomputer, and other parts connecting to the CPU 12 as follows: the CDMA RF unit 13; a microphone 14; a speaker 15; a voice processing unit 16; a manipulating unit 17 having key pads such as a "call start" key, a "call stop" key and numeral keys; a LCD (liquid crystal display) 18 showing time, date, phone numbers and others; and a memory 19 composed of a RAM (random access memory) and a ROM (read only memory).

Here, the CPU 12 operates as follows: to receive a neighbor BS list through the CDMA RF unit 13; to determine, based on the neighbor BS list, a candidate BS group which can be a BS to be next captured; to store in the memory 19 the candidate BS group. Furthermore, the CPU 12 then captures a BS whose pilot signal has the highest electric field intensity among the candidate BS group stored in the memory 19 at a timing for a request of location registry (LR). The CPU 12 then requests the location registry to the captured BS (capture BS).

Specifically, BS-A, BS-B, BS-C, BS-D and BS-E are located surrounding the cell phone 11 and BS-A, BS-B, BS-C, and BS-D are determined to be included in the candidate BS group. Here, as shown in FIG. 1B, since the pilot signal of BS-B has the highest intensity of the electric field among the candidate BS group, the cell phone 11 captures BS-B to request the location registry to BS-B. BS-A through BS-E are identified with a PN (pseudo noise) offset.

Figure 2:
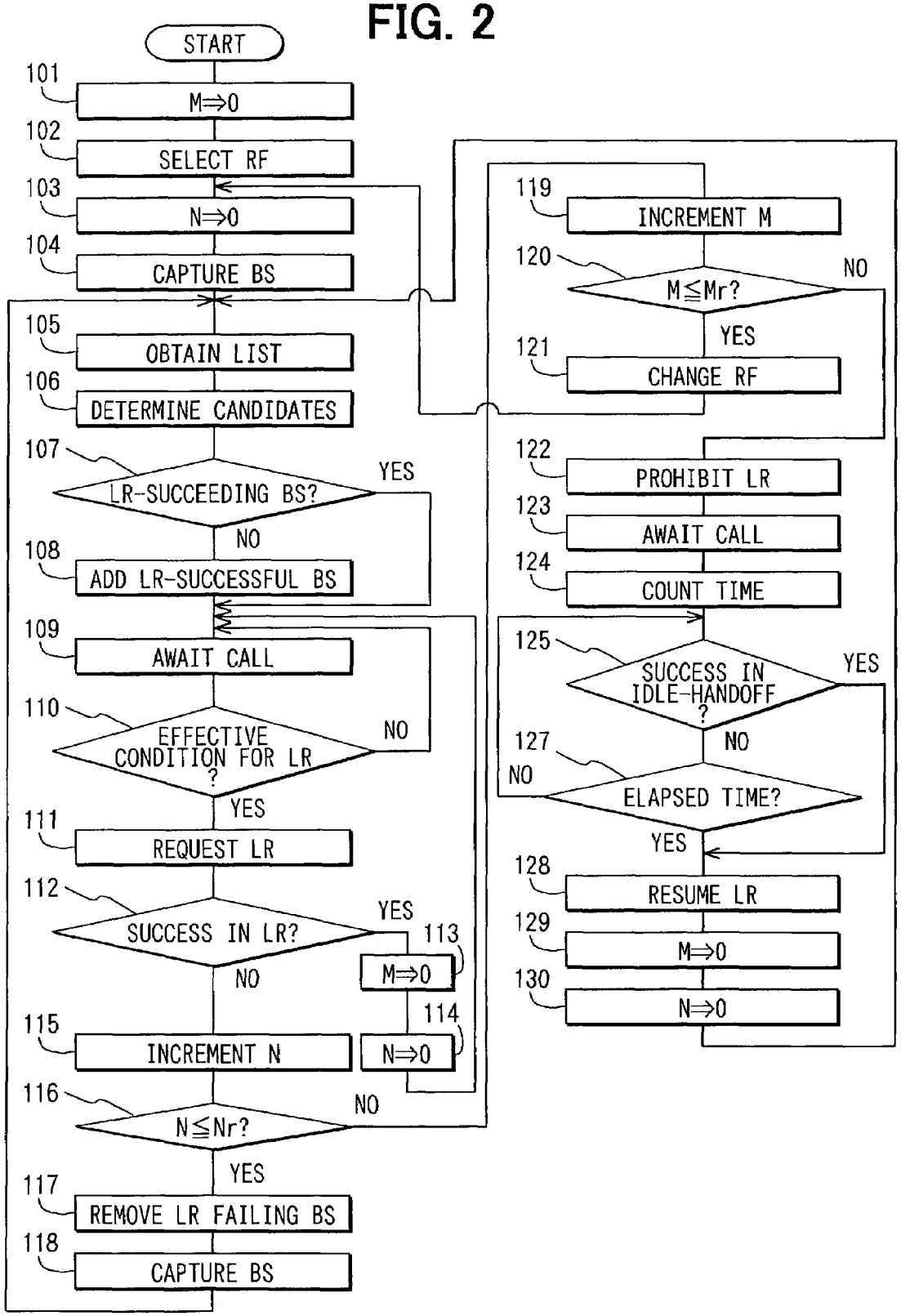
FIG. 2 is a flow diagram of procedures of a cell phone according to an embodiment of the present invention.
Figure 4:
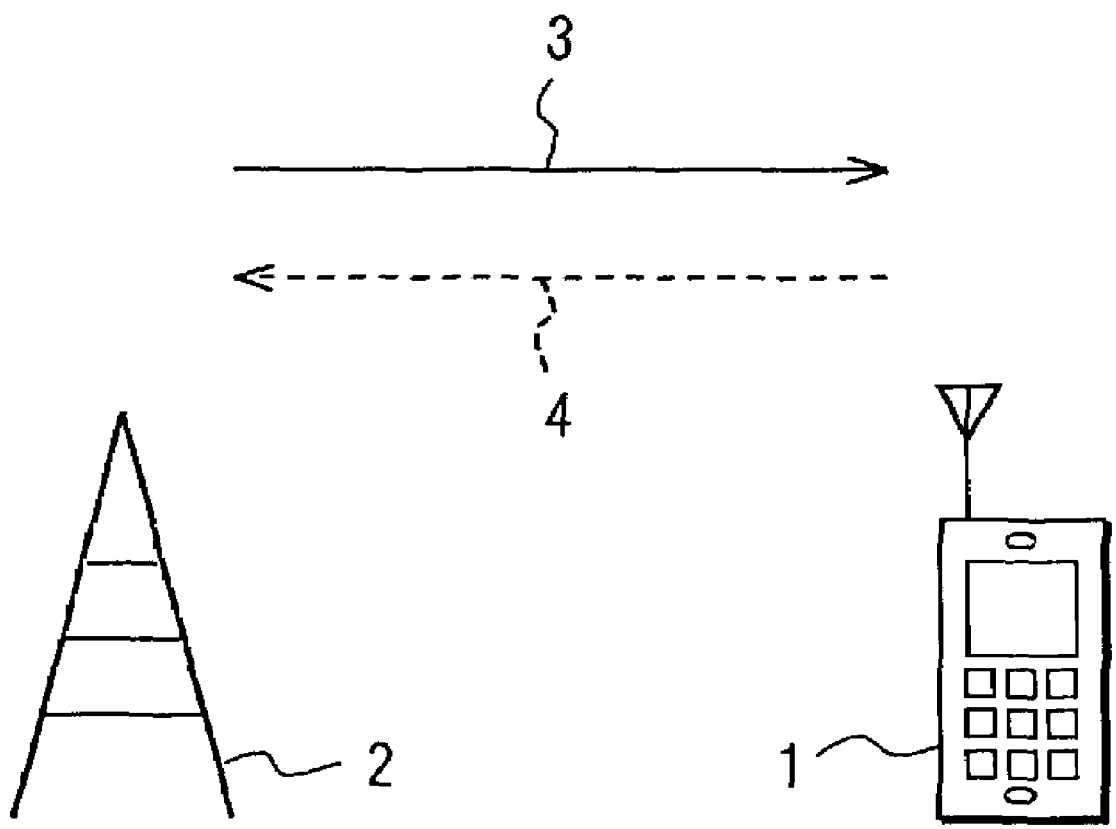
FIG. 4 is a schematic diagram of transmitting and receiving signals between a cell phone and a base station in a related art.

The CPU 12 is programmed to execute the processing shown in FIG. 2. This processing is stored in the memory 19 together with the tabled data shown in FIGS. 3A, 3B and 3C.

At step 101 the CPU 12 first starts to initialize a search count M to zero at a timing, for instance when a power turns on. Here, the search count M is the number of retry times of searching for a BS at each frequency. At step 102, the frequency to be used for searching for the BS is selected. At step 103, a request count N is initialized to zero. The request count N is the number of retry times of requesting at each frequency when location registry fails.

The CPU 12 then, at step 104, searches for BSs to capture a BS as a capture BS whose pilot signal has the highest electric field intensity (fulfilling a preset condition) among the searched BSs. Here, a neighbor BS list is obtained from the capture BS at step 105 and a candidate BS group, from which a next capture BS is to be captured, is determined based on the neighbor BS list at step 106.

The CPU 12 determines, at step 107, whether the candidate BS group includes a BS to which the location registry has most recently succeeded. When the BS is not included (NO at step 107), the BS is included in the group at step 108. Specifically, a candidate BS group includes, as shown in FIG. 3A, only BS-A, BS-B, BS-C and BS-D though the location registry to BS-E has recently succeeded. BS-E is hence added in the candidate BS group as shown in FIG. 3B.

The CPU 12 shifts to an idle (waiting) state at step 109 and then determines whether condition for request of location registry is effective at step 110. Upon affirmative determination (YES at step 110), the CPU 12 requests, at step 111, location registry to the previously captured BS (present capture BS). Whether the location registry is successful is determined at step 112.

Here, upon affirmative determination (YES at step 112), the above search count M and request count N are initialized to zero at steps 113 and 114, respectively and the procedure returns to step 109 to repeat the steps subsequent to step 109.

On the other hand, upon negative determination (NO at step 112), the request count N is incremented at step 115 and whether N reaches a preset reference Nr is determined at step 116. The preset reference Nr may be automatically set according to a system operation or be set arbitrarily by a user.

When the request count N is less than Nr (NO at step 116), the BS to which the location registry has failed is removed from the candidate BS group at step 117. The CPU 12 captures, at step 118, a BS whose pilot signal has the highest electric field intensity among the updated candidate BS group, then returning to step 105.

Specifically, provided that the location registry to BS-B failed, BS-B is removed from the candidate BS group as shown in FIG. 3C. The CPU 12 is to capture BS-E whose pilot signal has the highest electric field intensity among the above updated candidate BS group shown in FIG. 3C, then requesting the location registry to BS-E.

Here, the candidate BS group is updated by the two procedures: step 108 of adding the BS to which the location registry has recently succeeded, and step 117 of removing the BS to which the location registry has failed. However, only either one of the two procedures can be adopted.

In contrast, when the request count N reaches the preset reference Nr (NO at step 116), the search count M is incremented at step 119 and whether M is less than a preset reference Mr is determined at step 120. Here, the preset reference Mr is automatically set according to the system operation.

When the search count M is less than Mr (YES at step 120), the frequency for searching the BS is changed at step 121 and the procedure returns to step 103. When the search count M reaches Mr (NO step 120), the CPU 12 prohibits the request for the location registry at step 122. At step 123, the CPU 12 then maintains an idle (waiting) state where transmission, reception and an idle handoff to a certain BS are executable. Here, with maintaining an idle state, the electric field intensity of the pilot signal is observed from one BS to another. If there is a BS whose pilot signal has an electric field intensity exceeding a preset level, the BS is captured as an updated capture BS, which procedure is called the idle handoff.

The CPU 12 then starts clocking of a preset time T at step 124. The preset time T may be automatically set according to the system operation or be set arbitrarily by the user.

The CPU 12, after the start of the clocking of the preset time T, executes two determinations sequentially as follows: whether the idle handoff is successful at step 125, and whether the preset time T is elapsed at step 127. At least one of the two determinations is affirmative so that the procedure proceeds to step 128. Here, the prohibition of the location registry is released, following which the above search count M and request count N are initialized at steps 129 and 130, respectively. The procedure then returns to step 105.

As explained above, updating of the candidate BS group results in avoidance of the useless request of the location registry. This leads to increase of probability of the location registry success. Searching the BS by using several different frequencies also leads to increase of the probability of the success.

Furthermore, prohibiting the request of the location registry after the failure of it prevents the unsuccessful requests from being continuously repeated for a long time. This thereby leads to prevention of increase of the power consumption. Here, the request of the location registry is immediately resumed to a BS to which the idle handoff has succeeded. This results in shortening a period to the resumption of the request in comparison with the conventional approach of stopping the location registry for a preset period after the previous location registry failure.

In addition, since the idle state is maintained during the prohibition of the location registry, transmission and reception are quickly resumed upon the location registry success.

The period of the prohibition of the location registry is limited by the preset time T so that the request of the location registry is to be resumed even when the idle handoff never succeeds.

The above embodiment may be modified. For instance, a mobile station is not limited to a cell phone but also any portable information devices having communication functions compliant with the CDMA method. Furthermore, a computer program executed by a CPU is not only built in a cell phone but also downloadable to be installed as needed from an external device such as a server or a memory card.

What is claimed is:

1. A mobile station comprising:
    means for capturing a base station by searching for a plurality of base stations;
    means for obtaining a neighboring base station list from the captured base station;
    means for determining a candidate base station group including a base station able to be next captured based on the neighboring base station list obtained from the captured base station; and
    means for executing a request for location registry to the captured base station,
    means for prohibiting a request for location registry while maintaining an idle state, where at least an idle handoff is executable, when the location registry to the captured base station has failed,
    means for determining whether the idle handoff has succeeded;
    means for releasing the prohibiting of the request when it is determined that the idle handoff to a given base station has succeeded; and means for executing a request for location registry to the given base station.

2. The mobile station of claim 1, wherein in the idle state transmitting and receiving are also executable while the request is prohibited.

3. The mobile station of claim 1,
wherein the releasing means also releases the prohibiting of the request when a preset period elapses since the location registry to the most recently captured base station has failed.

4. A method of location registry for a mobile station, the method comprising:
capturing a base station by searching for a plurality of base stations;
obtaining a neighboring base station list from the captured base station;
determining a candidate base station group that includes a base station able to be next captured based on the neighboring base station list obtained from the captured base station;
executing a request for location registry to the captured base station;
prohibiting a request for location registry while maintaining an idle state, where at least an idle handoff is executed, when it is determined that the location registry to the captured base station has failed;
determining whether the idle handoff has succeeded and releasing the prohibiting of the request when it is determined that the idle handoff to a given base station has succeeded; and executing a request for location registry to the given base station.

5. The method of claim 4, wherein in the idle state, transmitting and receiving are also executable while the different request is prohibited.

6. The method of claim 4, wherein the prohibiting of the request is released when a present period elapses since the location registry to the most recently captured base station has failed.

7. A computer-readable medium encoded with a computer program for use in a location registry for a mobile station, the computer program comprising instructions for:
capturing a base station by searching for a plurality of base stations;
obtaining a neighboring base station list from the captured base station;
determining a candidate base station group that includes a base station able to be next captured, based on the neighboring base station list obtained from the captured base station;
executing a request for location registry to the captured base station;
prohibiting a request for location registry while maintaining an idle state, where at least an idle handoff is executed, when it is determined that the location registry to the captured base station has failed;
determining whether the idle handoff has succeeded and releasing the prohibiting of the request when it is determined that the idle handoff to a given base station has succeeded; and
executing a request for location registry to the given base station.

8. The computer-readable medium encoded with the computer program of claim 7, wherein in the idle state, transmitting and receiving are also executable while the request is prohibited.

9. The computer-readable medium encoded with the computer program of claim 7, wherein the prohibiting of the request is released, when a preset period elapses since the location registry to the captured base station has failed.

* * * * *